Oct. 22, 1968     J. P. ALEXANDER     3,406,765

SOIL SAMPLING APPARATUS

Filed Oct. 14, 1965     12 Sheets-Sheet 1

Fig.1.

INVENTOR.
JACK P. ALEXANDER
BY
Kenyon & Kenyon
ATTORNEYS

Oct. 22, 1968

J. P. ALEXANDER 3,406,765

SOIL SAMPLING APPARATUS

Filed Oct. 14, 1965

INVENTOR.
JACK P. ALEXANDER
BY Kenyon & Kenyon
ATTORNEYS

Fig. 12.

United States Patent Office 3,406,765
Patented Oct. 22, 1968

3,406,765
SOIL SAMPLING APPARATUS
Jack P. Alexander, Norman, Okla., assignor to The Samuel Roberts Noble Foundation Incorporated, Ardmore, Okla., a corporation of Oklahoma
Filed Oct. 14, 1965, Ser. No. 496,122
16 Claims. (Cl. 175—51)

ABSTRACT OF THE DISCLOSURE

A machine is disclosed for taking soil samples at predetermined intervals along a path of travel. A soil sampling tube is carried by the machine and is adapted to be inserted into the soil by the advancement of a piston. The piston movement is controlled by a valve which is actuated after the machine has traversed a predetermined distance of ground. A traveling contact block is rotated by the machine drive means and controls the means that actuates the valve and the means that stop movement of the machine after a predetermined interval.

---

This invention relates to a soil sampling apparatus, and more particularly to an apparatus for automatically taking samples at points spaced apart at a uniform distance regardless of variations in the speed of the vehicle transporting the device.

Various types of soil sampling devices are presently known. One type of device is designed for taking samples at locations determined by the operator. The device is positioned at the location where the sample is to be taken, and the operator causes a sample tube to be lowered into the ground to take a sample. Devices of this type have the obvious disadvantage that samples will not be taken at uniform distances and hence the samples will not necessarily be representative of the location being sampled. In order to obtain a representative sample, it is necessary that the distance between successive sampling locations be constant.

It is an object of this invention to provide a soil coring device which permits soil samples to be taken automatically at uniform distances regardless of variations in the speed of the vehicle transporting the sampling device, or to be taken manually, at the operator's option.

A further object of this invention is to provide a soil sampling apparatus having a reciprocable sample tube and means for causing the vehicle transporting the apparatus to stop and remain at rest while the sample tube is inserted into the ground, and to resume its forward motion when the sample tube has been withdrawn from the ground.

A further object is to provide a soil sampling apparatus which includes a reciprocable sample tube adapted to be inserted into the ground and a power driven auger in the sample tube for assisting in the obtaining of soil samples.

A further object of this invention is to provide a soil sampling device having a novel cycle controller which controls the taking of samples so that sample locations are spaced apart at a predetermined uniform distance.

A further object according to a specific embodiment of this invention is to provide a soil sampling apparatus mounted on a self-propelled vehicle.

These and other objects will be apparent from the specification which follows.

The sampling device according to the preferred embodiment of this invention is mounted on a self-propelled vehicle and includes a vertically reciprocable sample tube which is adapted to be inserted into the soil to receive a sample, a fluid cylinder housing a piston for controlling the reciprocation of the sample tube, a fluid pressure system including a solenoid-operated four-way valve for selectively admitting fluid under pressure to the opposite ends of the cylinder, and an electrical actuation system including means for halting the vehicle when the sample tube is inserted into the ground and a novel cycle controller for actuating the valve solenoids so that the sample tube is lowered into the ground at predetermined fixed distances regardless of variations in the speed of the vehicle. The solenoid operator for the four-way valve includes a pair of solenoids, one for actuating the downward movement of the sample tube and the other for actuating the upward movement of the sample tube. The cycle controller, which energizes the solenoid causing downward movement of the sample tube, includes a traveling contact block which is reciprocated back and forth by the two limit switches by a drive mechanism connected to one of the vehicle wheels, so that the speed of reciprocation of the contact block is directly proportional to the speed of the vehicle. Whenever this contact block strikes one of the limit switches, the valve solenoid causing downward movement of the sample tube is actuated, causing the four-way valve to be re-set so as to lower the sample tube into the ground for the taking of a sample. The electrical actuation system also includes a solenoid for automatically operating the vehicle clutch and brake causing the vehicle to come to a halt when the sample tube is inserted into the ground. A limit switch for actuating the second valve control solenoid to lift the sample tube from the ground when it has reached a predetermined depth is also provided.

Referring now to the drawings:

FIG. 5 is a perspective view of a portion of the belt and pulley drive for rotating an auger in said sample tube;

Figure 1:
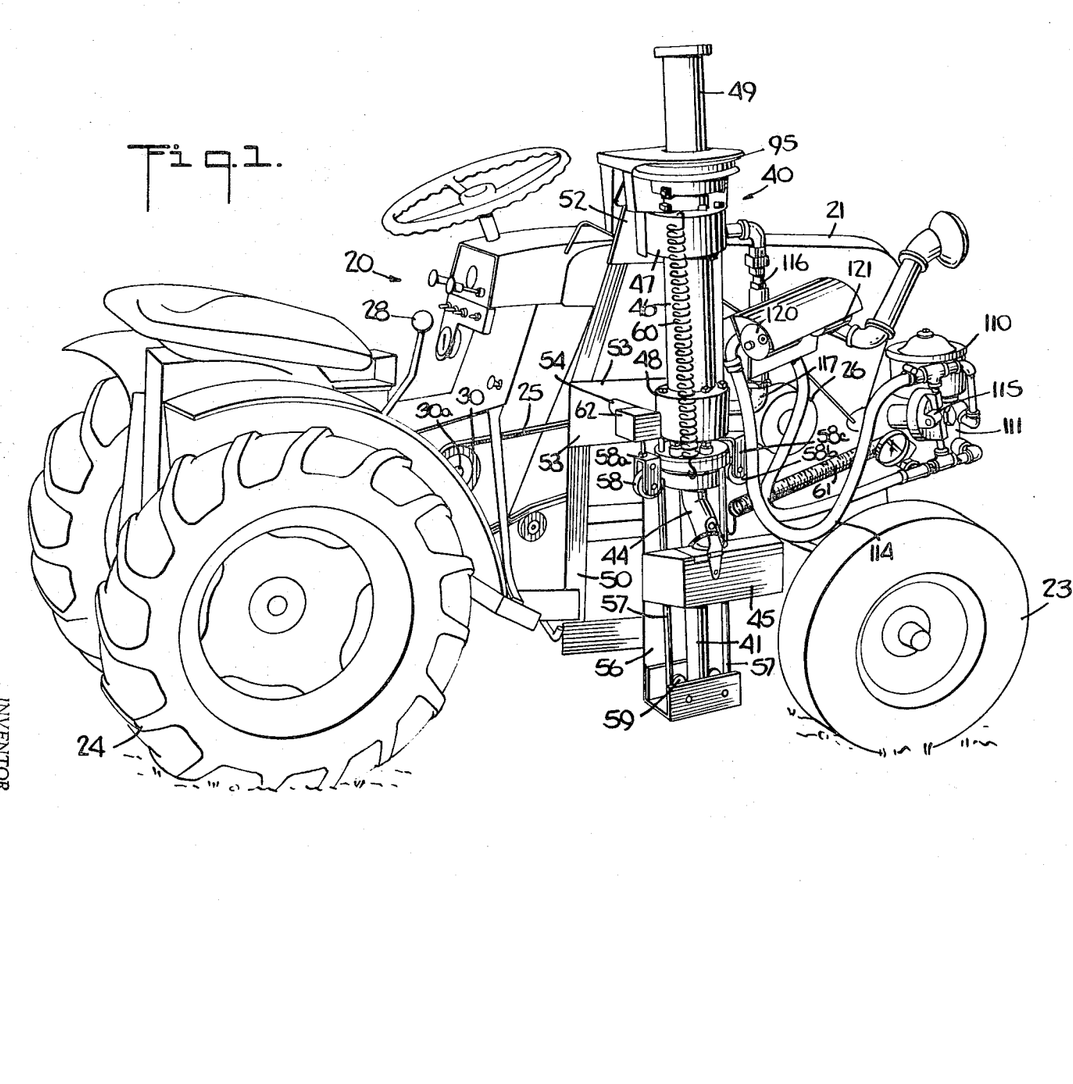
FIG. 1 is a perspective view of a self-propelled vehicle with the soil sampling apparatus of this invention mounted thereon, as seen from the right side of the vehicle.
Figures 2, 6A:
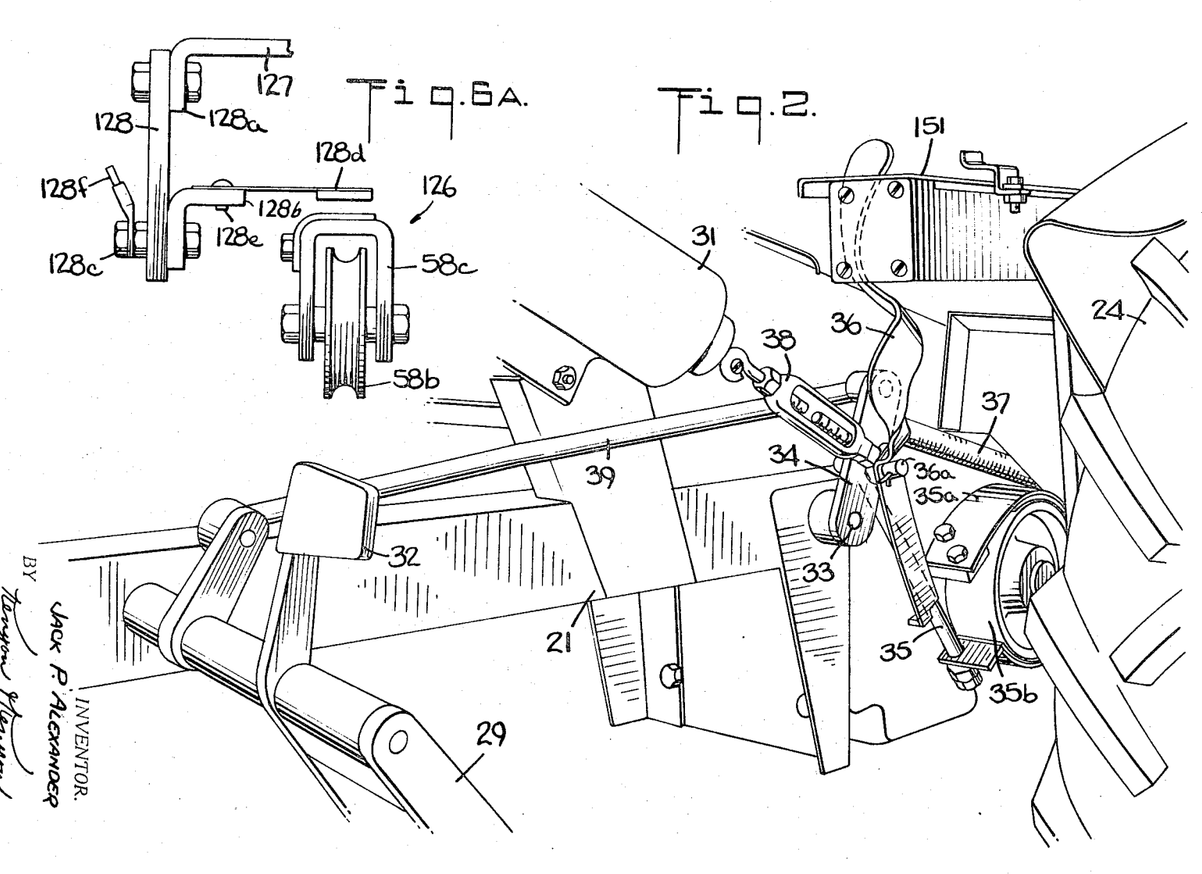
FIG. 2 is a perspective view of the automatic clutch control solenoid and vehicle brake, as seen from the left side of the vehicle.
FIG. 6A is a fragmentary side elevational view of the switch which controls de-energization of the solenoid which initiates downward movement of the sample tube, once such movement has been initiated.
Figure 3:
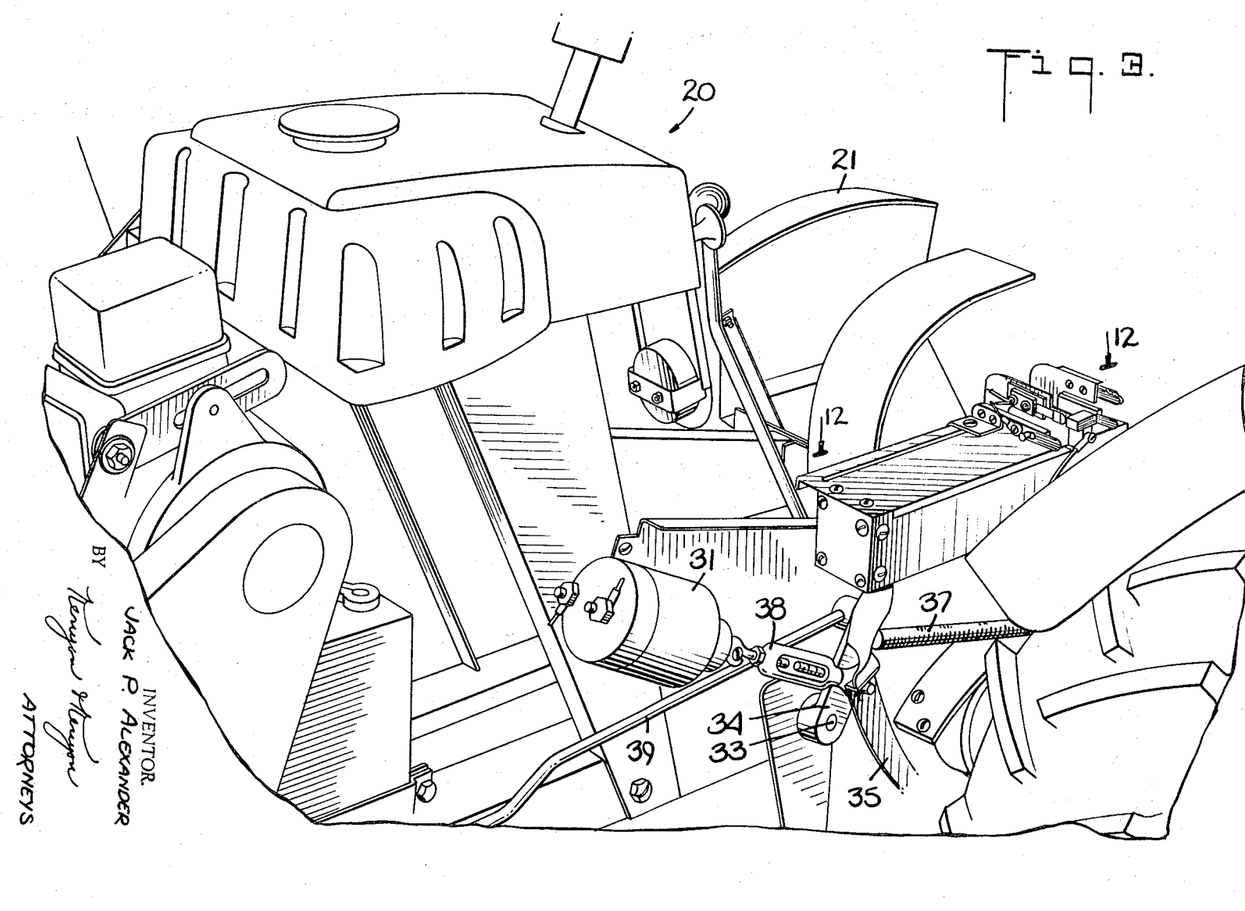
FIG. 3 is a perspective view of the solenoid and linkage for disengaging the vehicle drive belt and the control box for controlling the movements of the piston and sample tube.

Referring now to FIGS. 1, 2 and 3 and more particularly to FIG. 1, 20 denotes a self-propelled vehicle, such as a tractor, which has a frame indicated generally at 21, an engine (not shown), which may be a conventional internal combustion engine, a pair of front wheels 23, a pair of rear wheels 24, a drive belt 25 which transmits power from the engine to the rear wheels and which is driven by a master drive wheel 26 mounted on the engine shaft, a gear box (not shown) housing a conventional manual shift transmission, and a gear shift lever 28.

Figure 12:
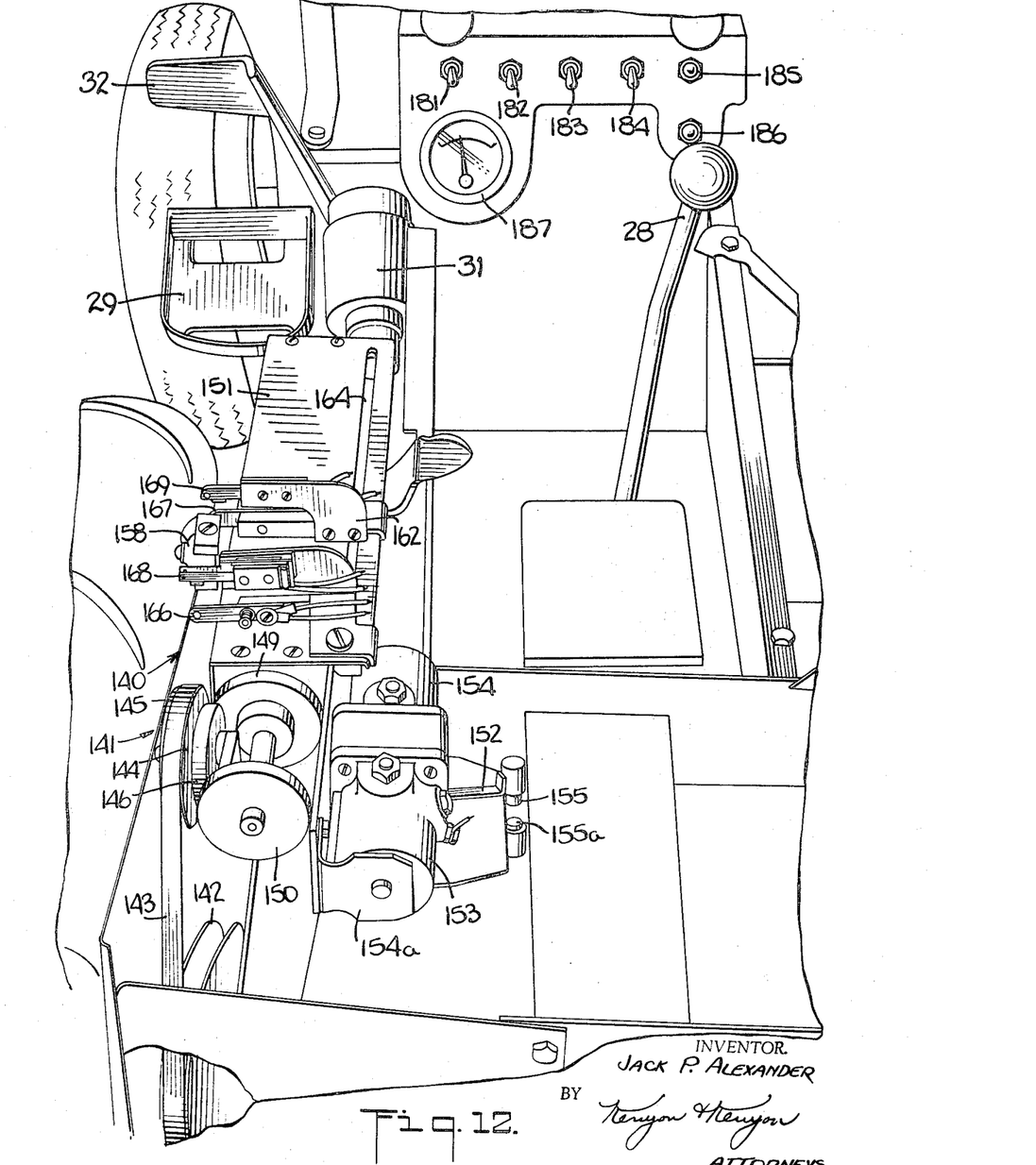
FIG. 12 is a perspective view as seen from the rear of the vehicle showing the vehicle dashboard, the cycle controller for the solenoids governing the four-way valve, and the idler control pedal for manual disengagement of the drive belt.
Figure 13:
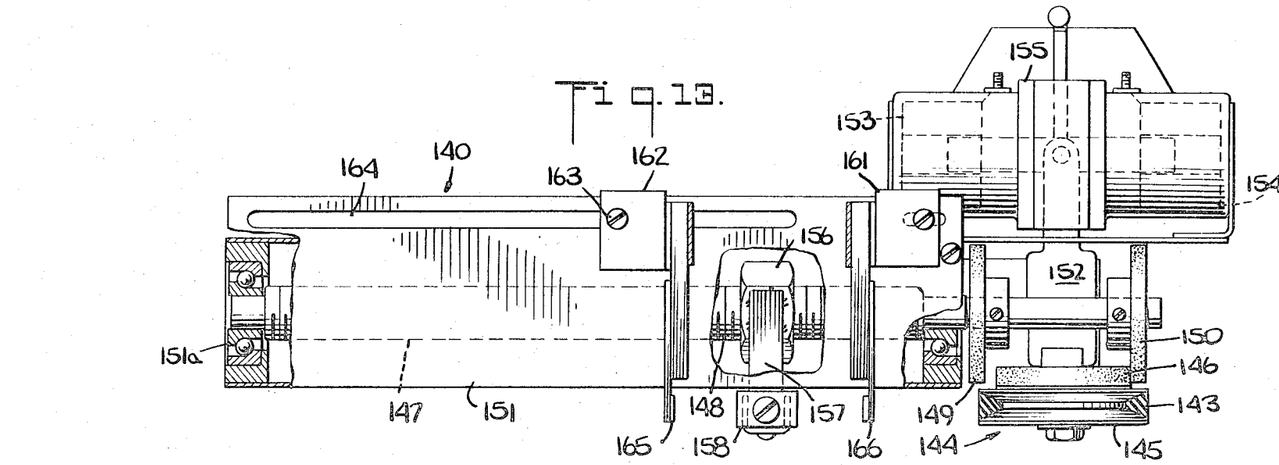
FIG. 13 is a top plan view, with parts broken away and parts shown in section, of the cycle controller which controls energization of the solenoids governing the four-way valve.
Figure 14:
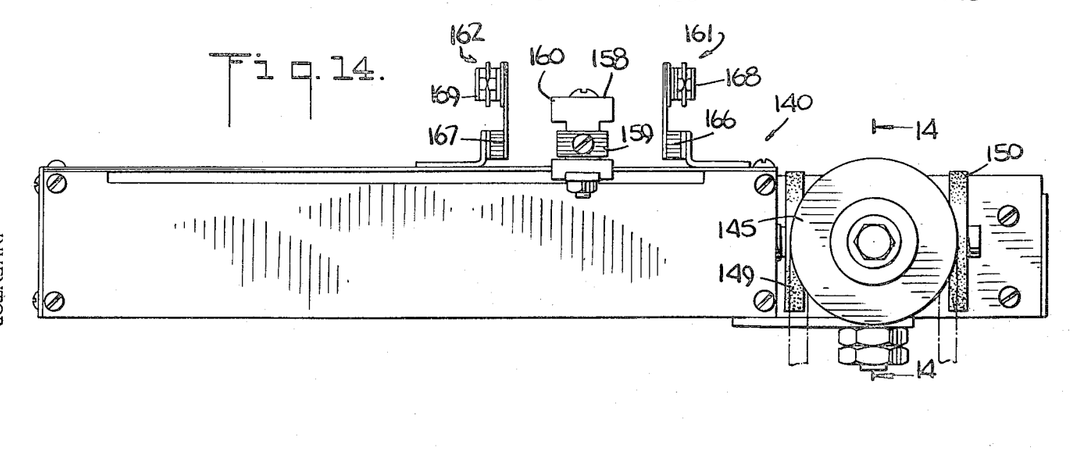
FIG. 14 is a side elevational view of the structure shown in FIG. 13.
Figure 15:
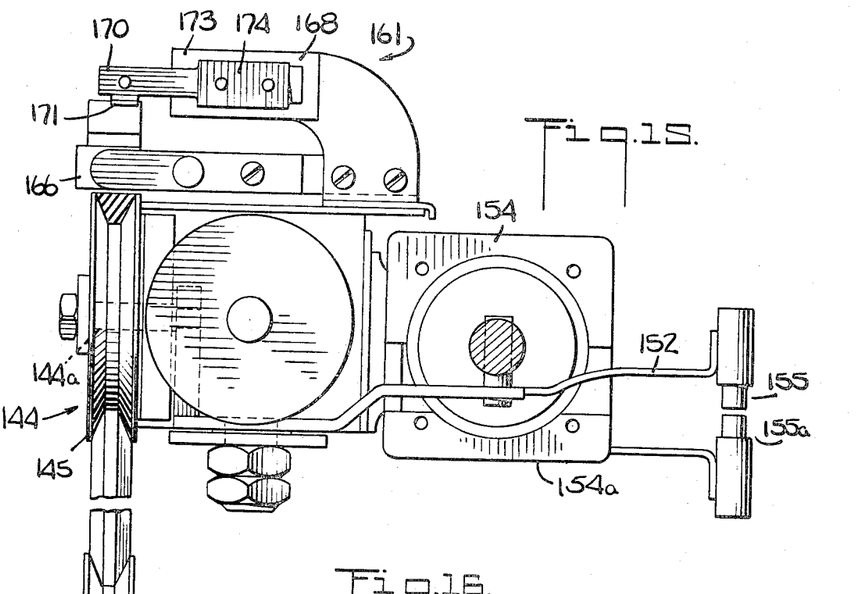
FIG. 15 is an end elevational view of the apparatus shown in FIG. 14.
Figure 16:
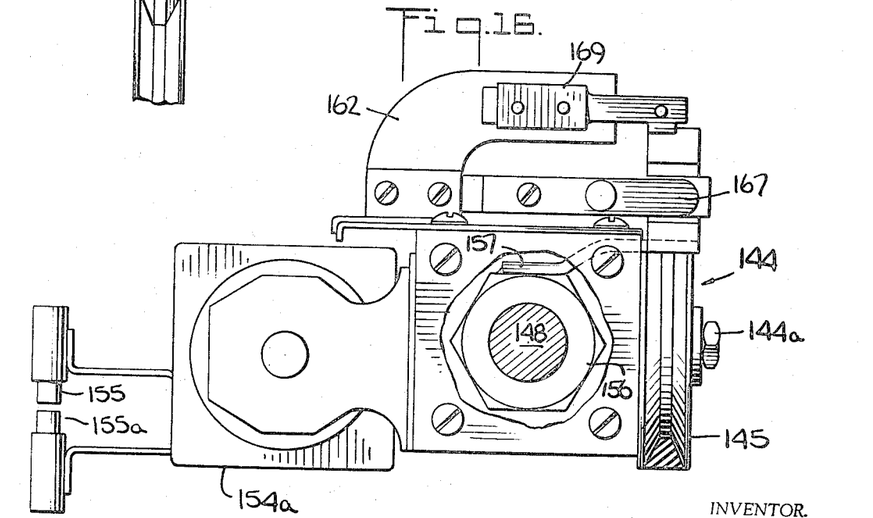
FIG. 16 is an end elevational view of the apparatus shown in FIG. 14, as seen from the opposite end from that shown in FIG. 15.

Vehicle 20 also includes an idler mechanism for rendering drive belt 25 inoperative. This idler mechanism comprises an idler wheel 30 which is normally in engagement with belt 25 but rotatable out of engagement therewith. Idler 30 is rotatably mounted on a stub shaft 30a attached to a lever arm (not shown), which in turn can be rotated by rock shaft 33 (FIG. 3). Rock shaft 33 is rotated by lever arm 34. Lever arm 34 can be moved manually by means of idler control pedal 32, which is operatively connected to lever arm 34 through rod 39. A footrest 29 (see FIG. 12) is provided. In order to shift gears, idler wheel 30 is moved out of engagement with drive belt 25 by depressing idler control pedal 32. A lever 35 is connected to lever arm 34 for the purpose of applying the brake to left rear wheel 24 when the idler wheel 30 is out of engagement with drive belt 25. This mechanism may be seen most clearly in FIG. 2. Link 35 is connected to lever arm 34 and to brake shoe 35a, which by frictional engagement with brake drum 35b coaxial with left rear wheel 24 applies the brake to that wheel. A brake lock 36 in the form of a manually controlled lever pivotally mounted to lever arm 34 by pin 36a is provided for manually locking brake shoe 35a against brake drum 35b. A tension spring 37 attached to lever arm 34 and to vehicle frame 21 normally halts idler wheel 30 in position for engaging belt 25.

In addition to the foregoing conventional elements, vehicle 20 also includes a clutch control solenoid 31 for automatically halting vehicle 20 for taking soil samples. Solenoid 31 is operatively connected to lever arm 34 through turnbuckle linkage 38, one end of which is pivotally mounted on lever arm 34 by pin 36a. When solenoid 31 is de-energized, idler wheel 30 is in engagement with drive belt 25. Energization of solenoid 31 moves idler wheel 30 to belt disengaging position by rotation of lever arm 34 and shaft 33 against the bias of spring 37.

Figure 4:
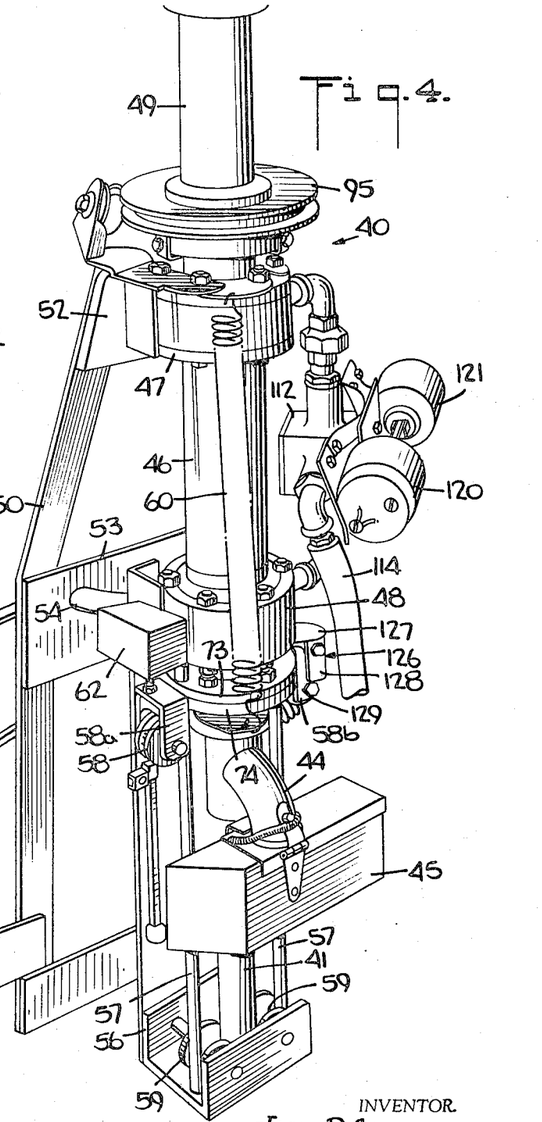
FIG. 4 is a perspective view of the sample tube of this invention and the receptacle for receiving soil samples from said sample tube, as seen from the right side of the vehicle.

Referring now to FIGS. 1 and 4, and more especially to FIG. 4, the sampling device of this invention, generally indicated at 40 includes a vertically reciprocable sample tube 41 which is normally held in retracted position above the ground and which is adapted to be lowered into the ground at predetermined distances as vehicle 20 travels in order to take soil samples. Sample tube 41 has an auger 42 (see FIG. 10) which has a bit 43 at its lower end for obtaining soil samples and conveying them upwardly through tube 41. A spout 44 which is in communication with the upper end of soil sample tube 41, and a receptacle 45 which is secured to spout 44, receive soil samples which are obtained by sample tube 41.

The reciprocatory movements of sample tube 41 are controlled by a fluid cylinder 46, which in the illustrated embodiment is operated by hydraulic fluid. Alternatively it may be operated by a gas such as compressed air. At the upper and lower ends respectively of cylinder 46 are an upper cylinder head 47 and a lower cylinder head 48. The upper end of sampling device 40, above upper cylinder head 47, comprises a rotatable housing 49 which provides a portion of the drive mechanism for auger 42.

The sampling device 40 is pivotally mounted on an upright frame 50 by means of a mounting screw 51 (see FIG. 5). Frame 50 has a plurality of horizontal beams including upper beam 52 which receives mounting screw 51 and beam 53 at an intermediate elevation and having an arcuate slot 54 which receives bolt or screw 55 for guiding the arcuate movements of the sampling device 40 about mounting screw 51. Mounting screw 51 is attached to the upper cylinder head 47 and bolt 55 is attached to the lower cylinder head 48.

A guide frame 56 is secured to the lower portion of upright frame 50 for guiding the reciprocatory movements of sample tube 41. Guide frame 56 includes a pair of vertical guide rails 57 which guide the movements of guide rollers 58, 58b, which are journaled in yokes 58a, 58c, respectively, secured to the upper end of sample tube 41. A second pair of guide rollers 59 journaled in the base of frame 56 contact sample tube 41 directly. Guide rollers 58 and 59 together assure that sample tube 41 will be reciprocated into and out of the ground without lateral movement.

A tension spring 60 retains the sample tube 41 in the "up" or retracted position when the vehicle 20 is not in operation. The sampling device is held by tension spring 61 in a position such that its lower end is slightly forward of its upper end. This facilitates entry of sample tube 41 into the soil when sample tube 41 is lowered into the soil while vehicle 20 is in motion. As sample tube 41 is lowered into the soil, the forward motion of vehicle 20 causes the sample tube 41 to be rotated about pivot screw 51 within the limits of rotation permitted by arcuate slot 54 and peg 55. When sample tube 41 is withdrawn, tension spring 61 returns the sampling device once again to its forward-pointing position as shown in FIG. 1. If vehicle 20 is brought to a halt before sample tube 41 is lowered into the ground, then sample tube 41 is inclined at the angle shown in FIGS. 1 and 5 at all times.

Referring to FIG. 5, auger 42 is driven from master drive wheel 26 through a belt and pulley system comprising a belt 90 which drives pulley 91. Mounting screw 51 serves as the shaft for pulley 91. Pulley 91 has two flanges so as to receive drive belt 90 and a second drive belt 92 which passes over pulleys 93 and 94 and drives flanged wheel 95 which is affixed to the exterior of rotatable housing 49. Rotatable housing 49 includes a cap 96 at its upper end which constitutes a closure member for the housing. Rotatable housing 49 drives auger 42 through a mechanism enclosed within the housing of sampling device 40. This mechanism will be described in detail with reference to FIGS. 10 and 11.

Figures 7, 9:
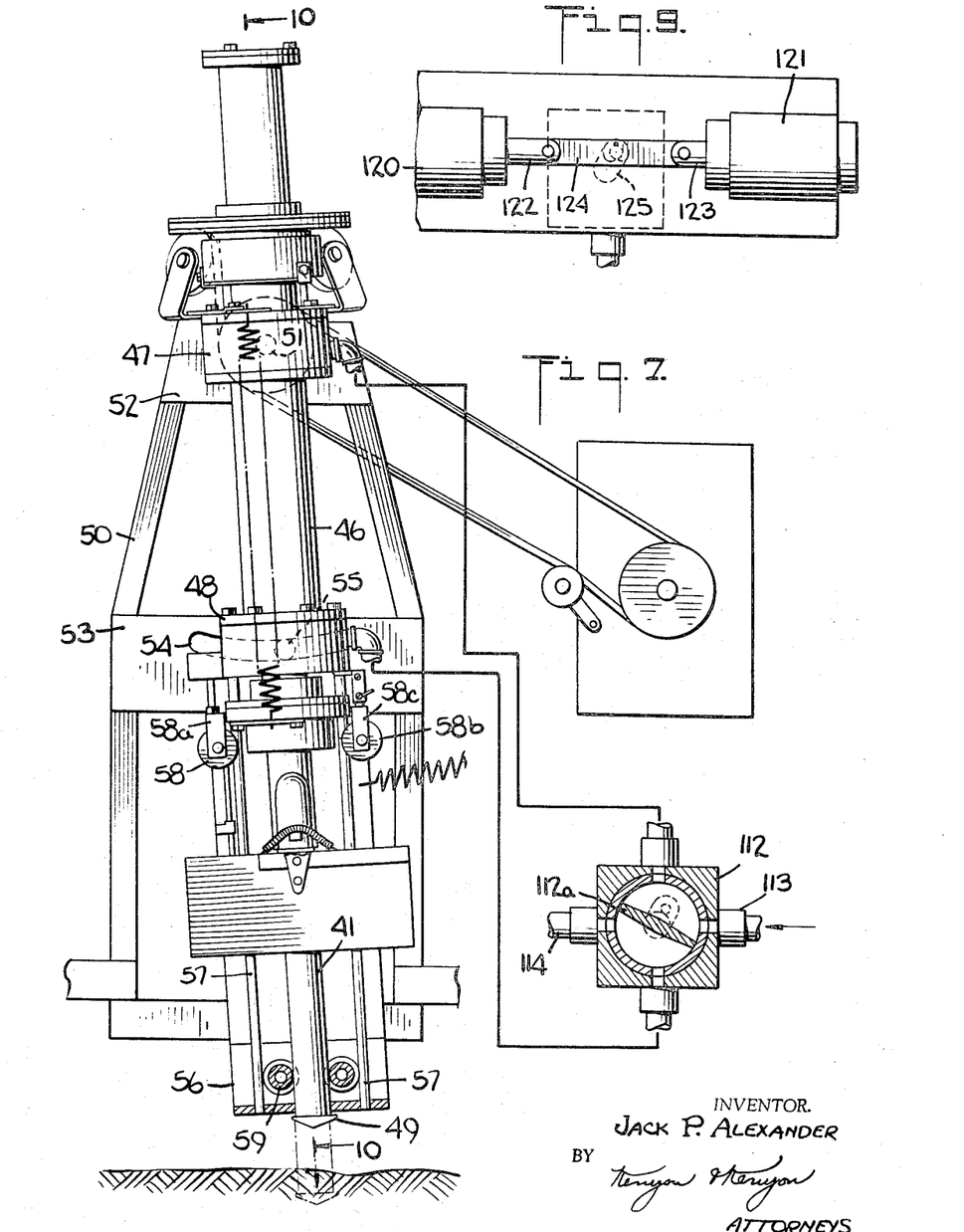
FIG. 7 is a partially schematic side elevational view, partly in section, of the soil sample tube and the four-way valve for selectively admitting fluid under pressure to the opposite sides of the piston which controls reciprocation of the sample tube.
FIG. 9 is a partial sectional view of the solenoid operator for the four-way valve.

Referring to FIGS. 1, 4 and 7 and especially to FIG. 1, the hydraulic system for actuation of sample tube 41 includes a fluid reservoir 110, which is similar to reservoirs for automotive power steering units, a positive displacement pump 111, a rotary four-way valve 112 having a plug 112a (which is obscured in FIG. 1 but shown in FIG. 7), a conduit 113 for high pressure fluid from the outlet of pump 111 to four-way valve 112, a return conduit 114 for low pressure fluid leading from four-way valve 112 to the low pressure side of pump 111, diaphragm controlled pressure regulating valve 115 which provides a bypass for return of fluid from the high pressure side to the low pressure side of pump 111 when outlet pressure becomes excessive, a conduit 116 connecting four-way valve 112 with upper cylinder head 47, and a conduit 117 which connects four-way valve 112 with lower cylinder head 48.

The operation of four-way valve 112 is controlled in a predetermined cycle so that sample tube 41 is lowered into the ground at evenly spaced distances along the ground, regardless of variations in speed of vehicle 20. Movements of rotary valve 112 are controlled by a solenoid system including a "down" solenoid 120 and an "up" solenoid 121. Referring especially to FIG. 9, links 122 and 123 extend outwardly from solenoids 120 and 121 respectively. A lever arm 124 is pivotally connected to both links 122 and 123. Lever arm 124 is rotatably mounted about shaft 125 which serves as the valve stem for actuation of rotary valve 112. Energization of "down" solenoid 120 causes fluid under pressure to be admitted to the upper end of cylinder 46, causing sample tube 41 to be lowered into the ground. Actuation of "up" solenoid 121 rotates lever arm 124 and shaft 125 to move the valve plug 112a in rotary valve 112 so that high pressure fluid is admitted to the bottom of cylinder 46, moving sample tube 41 to the "up" or retracted position. Valve plug 112a and shaft 125 remain in their previously set positions even after the de-energization of solenoids 120 and 121, and no further movement takes place until the other solenoid is energized so as to move rotary plug 112a in the opposite direction.

A switch 126 is provided on soil sampling device 40 for de-energizing "down" solenoid 120 at all times except when sample tube 41 is in its uppermost position. Details of this switch are shown in FIG. 6A. Switch 126 includes a bracket 127 which is secured to lower cylinder head 48, an insulator strip 128 secured to bracket 127 by means of bolt 128a, a conductive metal strip 128b secured to insulator 128 by means of bolt 128c, and a thin strip of spring steel or the like 128d secured to conductive strip 128b by means of bolt 128e. An electrical lead wire 128f is secured to bolt 128c and terminates at its other end at one terminal of solenoid 120. Metallic strip 128d is adapted to contact yoke 58c in which roller 58d is journaled. Contact is made when the sampling tube is in its uppermost position, making energization of solenoid 120 possible at that time. When sample tube 41 descends below its uppermost position, metal strip 128d and yoke 58c are out of contact, so that the ground connection is broken and solenoid 120 is de-energized. However, valve 112 remains in its previously set position, so that fluid under pressure is still supplied to the upper end of cylinder 46, closing further descent of sample tube 41 until it has been inserted into the ground to the desired depth.

Figure 6:
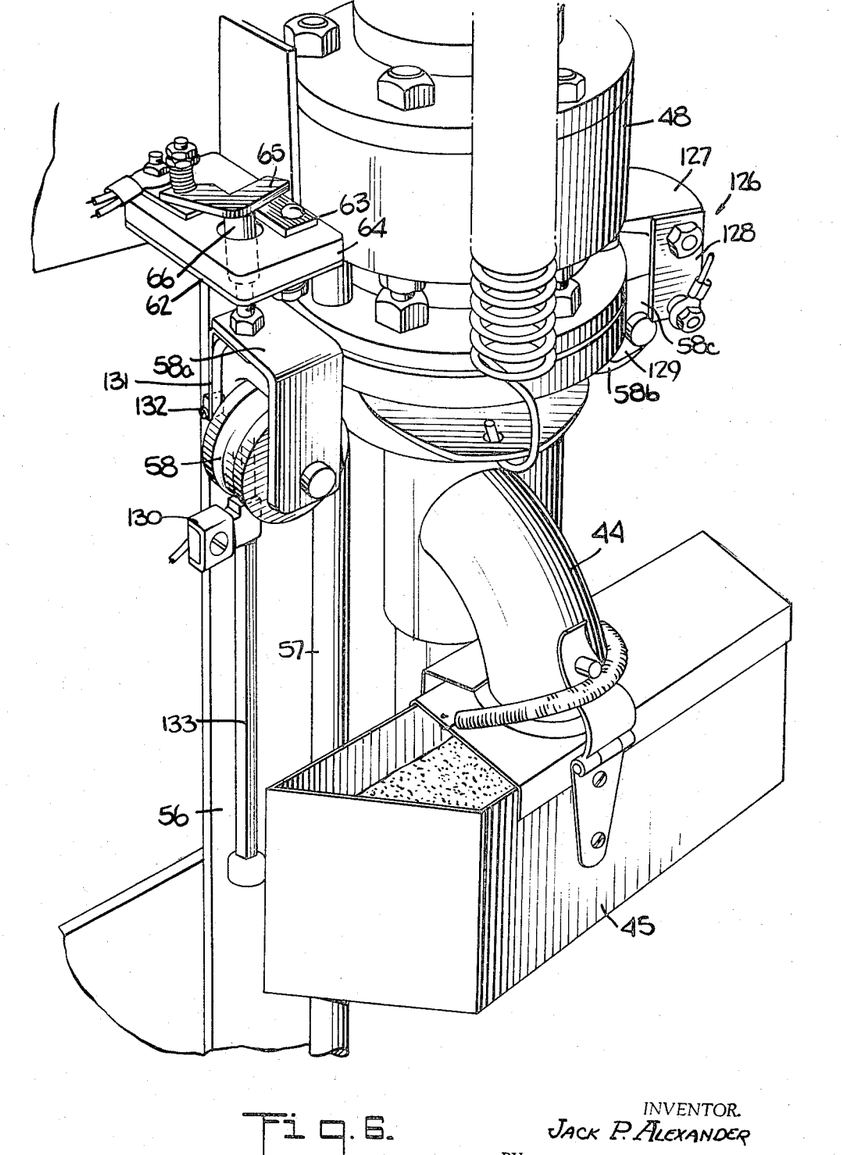
FIG. 6 is a detailed perspective view of the receptacle for soil samples and the lower portion of the cylinder in which the piston controlling the sample tube moves showing the switches for limiting the depth of penetration of the sample tube into the ground and for automatically stopping the vehicle when a sample is being taken.

Vehicle 20 is normally caused to stand when sample tube 41 is lowered into the ground. This is especially desirable when taking samples in hard soil, which might cause bending of tube 41 if vehicle 20 continues in motion while sample tube 41 is in the ground. Vehicle 20 is brought to a standstill by energizing solenoid 31, which causes idler wheel 30 to become disengaged from idler belt 25. An idler control switch 62 mounted on lower cylinder head 48 (FIGS. 4 and 6) controls energization of solenoid 31. This idler control switch 62, which may be seen best in FIG. 6, includes a fixed contact plate 63 secured to base 64, and a spring biased contact plate 65 which is normally held out of contact with plate 63 by means of a non-conductive peg 66 which is secured to one of the yokes 58a. When sample tube 41 is in its fully retracted or "up" position as shown in FIGS. 1, 4 and 7, switch 62 is open and idler control solenoid 31 is deenergized. This permits forward motion of vehicle 20 when sample tube 41 is in the fully retracted position. Whenever sample tube 41 descends below its fully retracted position, which occurs whenever a soil sample is being taken, peg 66 moves downwardly with the soil sample tube, permitting contact plate 65 to touch plate 63 so as to complete an electrical circuit energizing solenoid 31 and moving idler wheel 30 to belt-disengaging position. In this manner vehicle 20 is caused to stand whenever a soil sample is being taken. It is very desirable for vehicle 20 to remain stationary while a soil sample is being taken, in order to minimize bending stresses on sample tube 41. While vehicle 20 is standing, sample tube 41 is lowered into the ground, obtaining a soil sample.

When sample tube 41 has been inserted into the ground to the desired depth, a return switch 130, which is mounted on a non-conductive post 133 attached to guide frame 56 below roller 58, is grounded through contact point ground 132 and guide roller yoke 58. The position of switch 130 may be moved up or down along post 133 depending on the desired depth of penetration of sample tube 41 into the ground. Grounding of return switch 130 closes a circuit which energizes "up" solenoid 120. This moves rotary valve plug 112a to cause fluid under pressure to be admitted to the lower end of cylinder 46, which in turn lifts sample tube 41 out of the ground and returns it to its normal retracted position. As soon as the sample tube 41 starts to ascend, contact between switch 130 and contact point 132 is broken, so that solenoid 120 is deenergized. However, rotary plug valve 112a remains in its preset position, and fluid under pressure continues to be supplied to the lower end of cylinder 46 so that sample tube 41 continues to travel upward until it reaches its uppermost position.

Figures 8, 11:
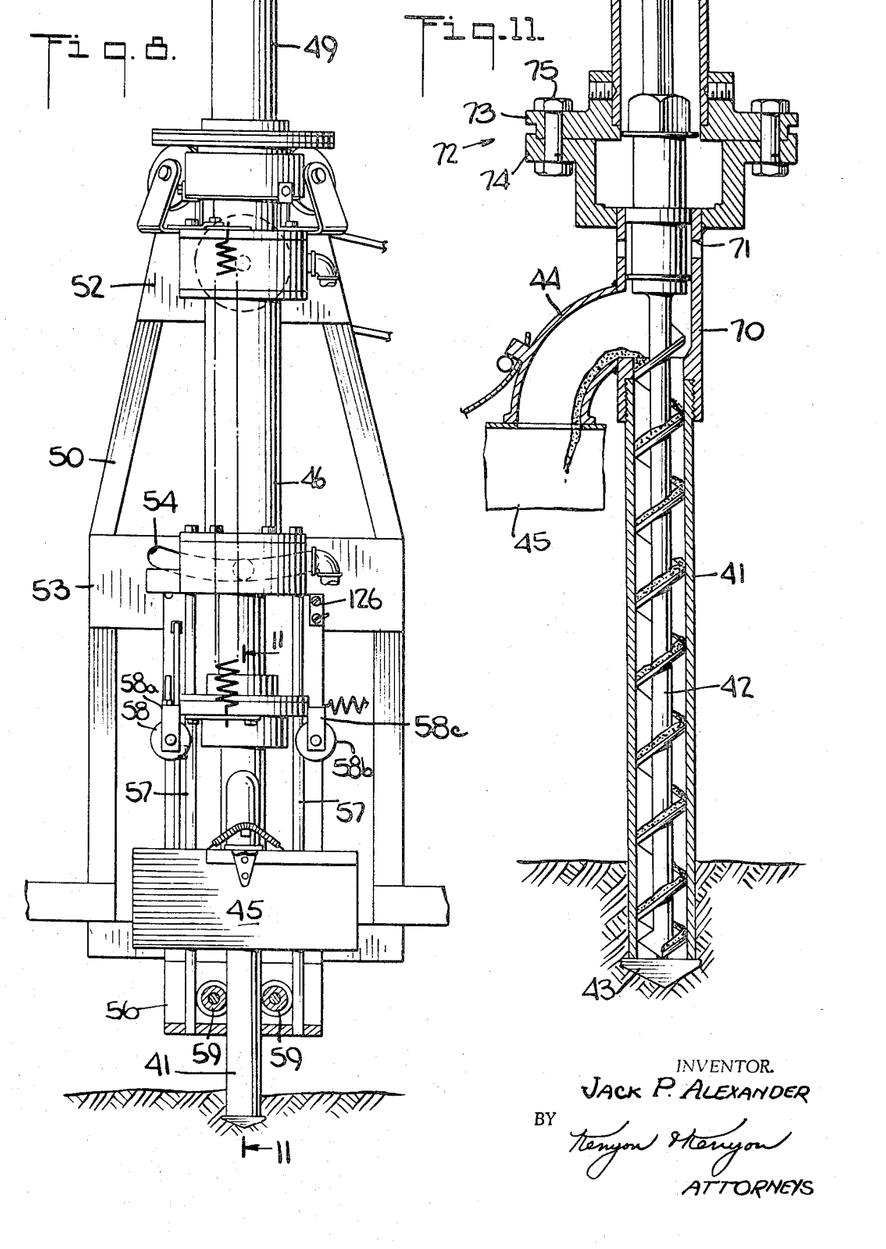
FIG. 8 is a partially schematic side elevational view of the soil sample tube of this invention, similar to FIG. 6 but showing the sample tube in another position.
FIG. 11 is a vertical sectional view of the soil sample tube and spout of this invention showing the tube inserted into the ground.
Figure 10:
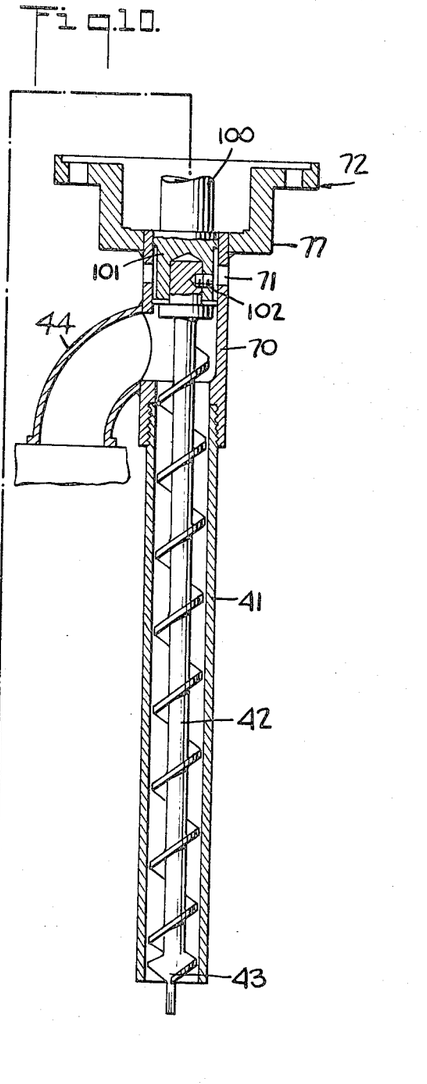
FIG. 10 is a vertical sectional view of the sampling device of this invention.

Referring now to FIGS. 10 and 11, the structure of soil sample tube 41 will be described in detail. Sample tube 41 is screw-threaded at its upper end to permit securing to a T fitting 70 to which spout 44 is connected. A plurality of holes 71 are provided at the upper end of T fitting 70 so as to permit the discharge of dust and prevent the compacting of soil within soil sample tube 41. Above T fitting 70 is a coupling 72 which includes an upper flange 73 and a lower flange 74, to which T fitting 70 is welded. The lower flange 74 may be generally bell-shaped as shown to provide a chamber enclosed by the coupling 72. Flanges 73 and 74 may be secured together by bolts 75.

Upper cylinder head 47 and lower cylinder head 48 have laterally extending bores 76 and 77 respectively, which are screw-threaded to receive flexible hose connections 78 and 79 respectively. A piston 80 is welded to hollow tubular shaft 81 which is secured to flange 73 by means of set screws 82. Reciprocation of piston 80 controls the reciprocation of sample tube 41. A fluid tight seal between piston 80 and the inside wall of cylinder 46 is provided by O-ring 83. O-rings 84 and 85 in upper cylinder head 47 and lower cylinder head 48 respectively provide fluid tight seals with hollow tubular shaft 81. The movements of piston 80 are controlled by admission of fluid under pressure alternatively to the cylinder 46 above piston 80 through conduit 76 or below piston 80 through conduit 77.

A cylindrical sleeve 97, of smaller diameter than housing 49 and concentric therewith, is welded to cap 96 so as to rotate therewith. A nut 98 is affixed to the lower end of sleeve 97. This nut has a square bore which receives auger drive shaft 99 of square cross section. Auger drive shaft 99 is connected to auger 42 (FIGS. 10 and 11) through a short cylindrical shaft 100, which terminates at its lower end in a sleeve 101 which receives the upper end of auger 42. A laterally extending screw 102 secures sleeve 101 and auger 42 together.

A stationary sleeve 103 extends about upper cylinder head 47, and supports bearing assembly 104 on which rotatable housing 49 is mounted. Rotatable housing 49 terminates at its lower end in an outwardly extending flange 105 and downwardly extending sleeve 106, which encloses bearing assembly 104 and is secured thereto by cap screw 107.

Referring now to FIGS. 12 to 17 inclusive, there is illustrated a cycle control mechanism indicated generally at 140 which controls the energization of solenoids 120 and 121 in response to forward motion of vehicle 20 so that distances between successive sample locations are uniform regardless of variations in the speed of vehicle 20. The cycle control mechanism 140 includes a drive mechanism 141 (FIG. 12) comprising a pulley 142 on the shaft of one of the rear wheels 24 (the left rear wheel in the embodiment illustrated) of vehicle 20, a belt 143 driven by pulley 142, and a drive wheel 144 which has a flange portion 145 to receive drive belt 143 and a friction drive surface 146. The cycle control mechanism also includes a screw-threaded shaft 147 having a screw-threaded portion 148 of substantial length and a pair of driven friction whees 149 and 150 near the end which is in proximity with drive wheel 144. A casing 151 encloses the screw-threaded portion 148 of shaft 147. The end of shaft 147 remote from drive wheel 144 is journaled in bearing assembly 151a supported by casing 151. The inner flat surfaces of friction wheels 149 and 150 are adapted to be driven alternatively by drive wheel 144. The distance between these inner flat surfaces is slightly greater than the diameter of friction drive surface 146, so that drive wheel 144 can drive only one of the driven wheels 149 and 150 at ime. The direction of rotation of shaft 147 depends on which of the wheels 149 and 150 is being driven. Drive wheel 144 is journaled for rotation about a shaft 144a to which armature 152 is attached. Armature 152 is a bracket extending in the direction of the axis of drive wheel 144. A pair of opposed electromagnets 153 and 154 are mounted on a plate 754a which is supported by housing 151 and by vehicle frame 21. Electromagnets 153 and 154 draw drive wheel 144 alternatively toward driven wheels 149 and 150 respectievly. To prevent armature 152 from "centering" so that drive wheel 144 would not engage either driven wheel 149 or 150, a pair of opposed electromagnets 155 and 155a attached to armature 152 and to mounting plate 154a, are provided. When the vehicle 20 is initially started up, armature 152 will be drawn toward one or the other of the electromagnets 153 and 154, depending on whcih one the armature is nearest.

The cycle control mechanism also includes a traveling nut 156 internally screw-threaded and mounted for reciprocation along the screw-threaded portion 148 of shaft 147. An arm 157 attached to nut 156 supports a contact block 158. This contact block 158 includes an electrically conductive surface 159 at its midportion and a non-conductive surface 160 at its upper portion. The limits of travel of contact block 158 are controlled by a pair of limit switches 161 and 162 which are supported on housing 151. Limit switch 161 is fixed to the housing and is located in proximity with wheel 149. Limit switch 162 is movable along the length of housing 151. Limit switch 162 includes a screw 163 which slides in slot 164 in housing 151, and a nut 165 on the end of screw 163 for tightening limit switch 162 in desired position. The distance between limit switches 161 and 162 controls the distance between successive samples taken by sample tube 41. The distance between successive samples is directly proportional to the distance between limit switches 161 and 162.

Except for the fact that limit switch 161 is fixed to housing 151 while limit switch 162 is movable, these switches are of the same construction and are mirror images. Limit switches 161 and 162 include conductive strips 166 and 167 respectively, which are located at the same height as the conductive portion 159 of movable contact block 158. Limit switches 161 and 162 also include make-or-break switches 168 and 169 respectively, which are normally in the closed position but adapted to be opened by non-conductive portion 160 of contact block 158. When traveling contact block 158 reaches either end of its travel, conductive surface 159 strikes the conductive surface of a limit switch block at the same time that non-conductive surface 160 opens the make-or-break switch of that limit switch. Contact of conductive surface 159 with either of the conductive strips 166 and 167 of limit switches 161 and 162 respectively causes a circuit to be closed which energizes "down" solenoid 120. At the same time the make-or-break switch 168 or 169 is opened. When make-or-break switch 168 of contact block 161 is opened, electromagnet 153 is de-energized and armature 152 is drawn toward electromagnet 154. This reverses the direction of screw 147, so that traveling nut 156 now travels toward the opposite limit switch 162. As soon as traveling nut 158 moves away from limit switch 161, conductive surface 159 and conductive strip 166 are no longer in contact, and "down" solenoid 120 is de-energized. As previously noted, the descent of sample tube 41, which is initiated by the energization of "down" solenoid 120 will also de-energize "down" solenoid 120 by opening of switch 126. The sample tube 41 continues to descend as previously described until it reaches its predetermined depth of travel in the ground. When movable contact block 158 strikes limit switch 162, conductive surface 159 and conductive strip 167 come into contact, and this also causes energization of "down" solenoid 120. The simultaneous opening of make-or-break switch 169 causes electromagnet 154 to be de-energized, drawing armature 152 toward electromagnet 153 and drive wheel 144 toward driven wheel 149. This reverses the direction of shaft 147 so that traveling nut 156 now proceeds toward contact block 161.

Figures 17, 18:
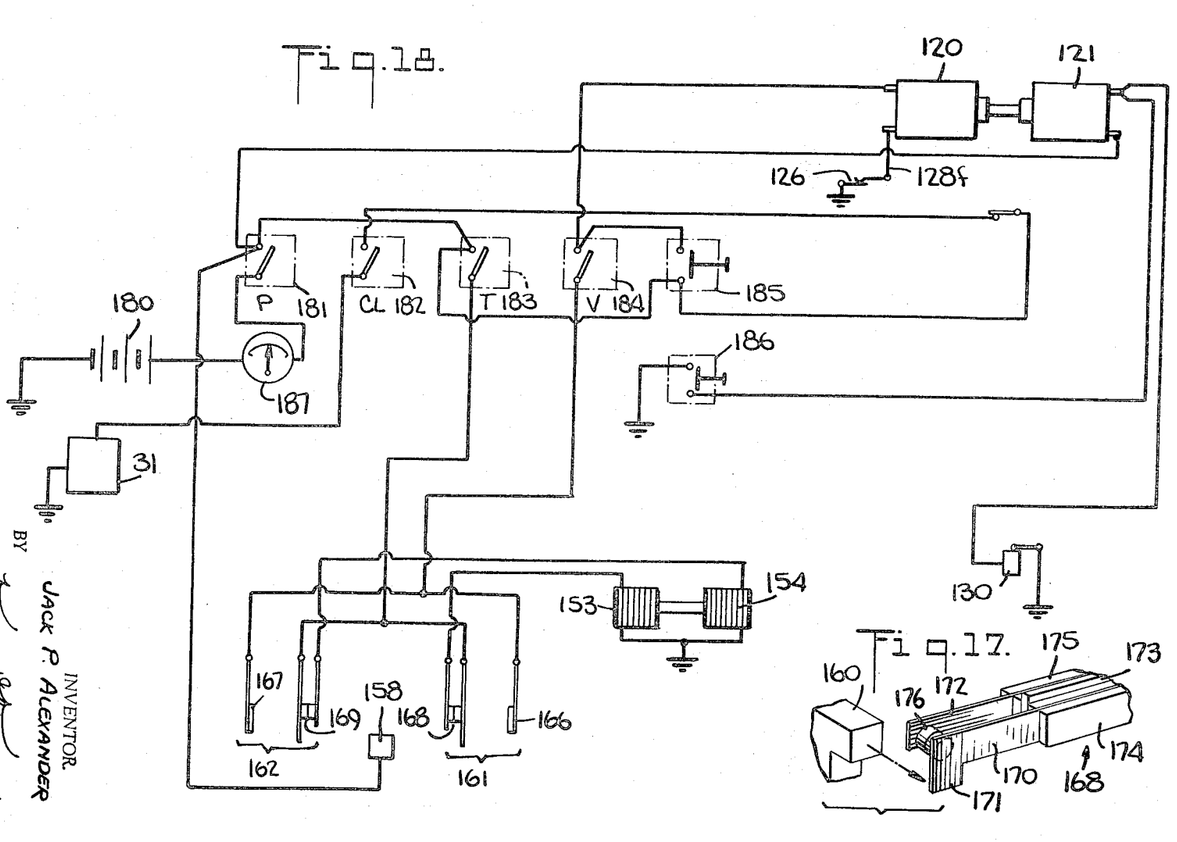
FIG. 17 is a detail of a make-or-break switch in the cycle controller.
FIG. 18 is a circuit diagram of the electrical system for the soil sampling device of this invention.

The details of make-or-break switches 168 and 169 are shown in FIG. 17. For purpose of illustration, switch 168 is illustrated. This switch incudes a first conductive strip 170 having a downwardly extending portion 171 which is adapted to be engaged by the non-conductive portion 160 of traveling block 158. A switch 168 has a second conductive strip 172, spaced apart from the first conductive strip 170 by means of non-conductive spacers 173. The assembly of conductive strips 170 and 172 and spacers 173 is held together by means of clamping blocks 174 and 175 and bolts not shown. A conductive post 176 on conductive strip 172 is normally in contact with strip 170. When contact block 158 strikes the extension 171 on strip 170, strip 170 is moved out of contact with post 176, causing switch 168 to be opened.

The electrical system for controlling the operation of the soil sampling device of this invention will now be described with respect to FIG. 18, which is a circuit diagram. The electrical system includes a battery 180 as its source of power. The electrical system also includes a main switch 181, a clutch control switch 182, a timer switch 183, and a valve control switch 184, all toggle switches located on the dashboard of vehicle 20. A pair of push button switches 185 and 186, also located on the dashboard, permit manual energization of "down" solenoid 120 and "up" solenoid 121 respectively. An ammeter 187 mounted on the dashboard is located in the circuit between battery 180 and main switch 181.

Switches 181, 182, 183 and 184 are all in the closed position during automatic operation of the soil sampling device. Push button switches 185 and 186 are in the open position during automatic operation, and are closed to cause manual lowering and lifting respectively of sample tube 41.

The operation of the soil sampler will now be described. Prior to turning on the ignition switch (not shown) toggle switches 181, 182, 183 and 184 are all set in the closed position when it is desired to take soil samples automatically. The ignition switch, which is a conventional key-operated automotive ignition switch is then turned on while idler pedal 32 is depressed. This starts the engine. Starting of the engine causes rotation of auger 48 in the sample tube 41. However, lowering of the sample tube 41 into the ground is not initiated until vehicle 20 is in motion.

The vehicle 20 is put in gear and idler pedal 32 is let out, initiating forward motion of the vehicle. The forward motion of vehicle 20 places drive belt 143, which controls the cycle control mechanism, in motion. Armature 152 is drawn at random toward one of the solenoids 153 and 154 in the cycle control mechanism. Assume for the moment that armature 152 has been drawn at random toward solenoid 153. This places the drive wheel portion 146 of wheel 244 in contact with driven wheel 149. This rotates shaft 147 in the direction causing movement of nut 156 in contact block 158 toward limit switch 161. The soil sample tube 41 remains in its uppermost position due to the bias of tension spring 60 until contact 158 strikes limit switch 161. Neither "down" solenoid 120 nor "up" solenoid 121 is energized at this time. When traveling contact block 158 strikes limit switch 161, the conductive portion 159 of traveling contact block 158 strikes conductive strip 166 and simultaneously the non-conductive portion 160 of traveling contact block 158 causes make-or-break switch 168 to open. The opening of make-or-break switch 168 causes solenoid 153 to be de-energized, so that armature 152 is drawn toward solenoid 154 and the direction of rotation of screw 147 is reversed. At the same time the making of contact between conductive portion 159 and conductive strip 166 closes the circuit to "down" solenoid 120, causing energization of this solenoid and thereby actuating four-way valve 112 to initiate downward movement of sample tube 41.

As soon as sample tube 41 moves downwardly below its uppermost position, "down" solenoid is deenergized by the opening of switch 126. Four-way valve 112 retains its previously set position so that dowward movement of sample tube 41 continues until the sample tube enters the ground. Meanwhile, descent of sample tube 41 below its uppermost position also closes switch 62 which in turn energizes idler solenoid 31, disengaging idler wheel 20 from drive belt 25 and thereby causing vehicle 20 to come to a standstill. Brake shoe 35a simultaneously engages brake drum 35b on rear vehicle wheel 24. This causes the vehicle 20 to stand in position while sample tube 41 is lowered into the ground. This is particularly important in hard packed soils in order to minimize bending stresses on the sample tube 41 which would occur if this sample tube were inserted into the ground while vehicle 20 is in motion.

When sample tube 41 has penetrated to a predetermined depth in the ground, switch 130 is closed, energizing "up" solenoid 121 and rotating four-way valve 112 so that upward movement of sample tube 41 is initiated. Vehicle 20 remains standing until the sample tube 41 reaches its uppermost position. Then idler control solenoid 31 is de-energized, again placing idler wheel 30 in contact with drive belt 25 so that forward motion of vehicle 20 resumes.

While vehicle 20 is standing, movement of contact block 158 ceases. As soon as the vehicle resumes its forward motion, contact block 158 resumes its traveling toward limit switch 162. While contact block 158 is traveling toward limit switch 162, the sample tube 41 remains in its uppermost position. When contact block 158 strikes limit switch 162, the "down" solenoid 120 is once again actuated so as to initiate downward movement of sample tube 41, the vehicle 20 is brought to a standstill, and solenoid 154 is de-energized so that armature 152 is drawn toward solenoid 153 and rotation of shaft 147 is reversed, again drawing contact block 158 toward limit switch 161. This completes a full cycle of automatic operation of the soil sample tube 41.

It will be observed that the speed of rotation of drive wheel 144 in the cycle control mechanism and hence the speed of traveling movement of contact block 158 is directly proportional to the speed of the rear wheels 28 of vehicle 20. Hence the distance between successive insertions of sample tube 41 into the ground will remain exactly the same regardless of variations in the speed of the vehicle. The distance between successive sample locations can be determined by setting limit switch 162 in the desired position prior to the taking of samples and then tightening the adjusting screw so that this limit switch 162 remains in position. For ease in setting sample distances, it is desirable to place a graduated scale indicating distances between successive sample locations on housing 151.

When taking samples in soft soil, it is not necessary to cause vehicle 20 to stand in order to take samples. The lower end of sample tube 41 is pointed slightly forward so as to facilitate entry of the sample tube into the soil as the vehicle 20 is moving slowly forward. In order to cause vehicle 20 to continue its forward motion without interruption when sample tube 41 is lowered into the ground, idler control switch 182 is placed in its open position. This causes idler solenoid 31 to remain de-energized at all times, so that forward movement of the vehicle 20 is not interrupted.

When it is desired to operate vehicle 20 without taking samples, main switch 181 is placed in the open position. This prevents operation of the cycle control mechanism 140 and of the solenoids 153 and 154 associated therewith. This also prevents energization of "down" and "up" solenoids 120 and 121 respectively.

Sometimes it is preferred to take samples at predetermined locations selected by the operator of vehicle 20 rather than to take samples automatically as vehicle 20 is driven forward. In order to take samples manually, the operator brings the vehicle 20 to a halt at the desired sample location, closes switch 181 and presses push button switch 185 to cause energization of "down" solenoid 120. Switches 182, 183 and 184 may be open. When the soil sample tube has reached the desired depth in the ground, the operator presses push button switch 186 to cause operation of "up" solenoid 121. Of course depth control switch 130 can be utilized in lieu of manual switch 186 for returning the sample tube 41 upwardly.

What is claimed is:

1. Apparatus for taking soil samples comprising a self-propelled vehicle, a vertically reciprocable soil sample tube mounted on said vehicle, said tube being adapted to be inserted into the ground to receive soil samples at its lowered end, means associated with said tube for receiving soil samples obtained by said tube, a piston operatively connected to said tube for raising and lowering the same, a source of fluid under pressure, a four-way valve adapted to admit fluid under pressure from said source selectively to the opposite sides of said piston, solenoid means for controlling the position of said four-way valve, said solenoid means including a solenoid for moving said four-way valve to a position causing downward movement of said sample tube, means for energizing said solenoid to cause said downward movement at predetermined distances of travel of said vehicle, said means energizing said solenoid only when said piston is at the top of its stroke, means for de-energizing said solenoid when said piston descends below the top of its stroke, said valve including means for retaining its pre-set position after said solenoid is de-energized, and means for reversing said valve and thereby returning the piston to the top of its stroke when said sample tube is inserted to a predetermined depth into the ground.

2. Apparatus for taking soil samples comprising a self-propelled vehicle, a vertically reciprocable soil sample tube mounted on said vehicle, said tube being adapted to be inserted into the ground to receive soil samples at its lower end, means associated with said tube for receiving soil samples obtained by said tube, a piston operatively connected to said tube for raising and lowering the same, a source of fluid under pressure, a four-way valve adapted to admit fluid under pressure from said source selectively to the opposite sides of said piston, solenoid means for controlling the position of said four-way valve, said solenoid means including a solenoid for moving said four-way valve to a position causing descent of said sample tube into the ground, means for energizing said solenoid at predetermined distances of travel of said vehicle, a second solenoid for reversing said four-way valve and thereby causing said sample tube to be withdrawn from the ground, and means for actuating said second solenoid when the sample tube is inserted to a predetermined depth into the ground.

3. Apparatus for obtaining soil samples comprising a self-propelled vehicle, a vertically reciprocable sample tube mounted on said vehicle, a discharge spout for discharge of soil samples from said tube, a receptacle for receiving soil samples discharged through said spout, a piston operatively connected to said soil sample tube for raising and lowering the same, a source of fluid under pressure, a four-way valve adapted to admit fluid under pressure from said source selectively to the opposite sides of said piston, a solenoid for controlling the position of said four-way valve, said solenoid being adapted to be energized only when said piston is at the top of its stroke and to be de-energized as said piston descends below the top of its stroke, said four-way valve being adapted to retain a previously set position after de-energization of said solenoid, a second solenoid for actuating said four-way valve to raise said piston when said soil sample tube reaches a predetermined depth in the ground, and means for actuating said first mentioned solenoid comprising a screw-threaded shaft mounted for rotation, means for rotating said shaft in either direction, a traveling contact member moved in a reciprocatory path by rotation of said shaft, a pair of limit switches defining the ends of travel of said contact member, said contact member being adapted to close an electrical circuit causing energization of said first mentioned solenoid when said contact member strikes either of said limit switches, and means for reversing the direction of rotation of said shaft when said contact member strikes either of said limit switches.

4. Apparatus according to claim 3 including means for varying the distance between said limit switches whereby the distance traveled by said vehicle between successive insertions of said sample tube into the ground may be varied.

5. Apparatus according to claim 3 wherein said means for rotating said shaft in either direction comprises a drive wheel, a direct drive mechanism driven by a wheel of said self-propelled vehicle whereby the ratio of turns of said drive wheel to said vehicle wheel is constant, and a pair of driven wheels secured to said shaft and adapted to be engaged alternately by said drive wheel, said driven wheels being so arranged that engagement of said drive wheel with one of said driven wheels causing rotation of said shaft in one direction and engagement of said drive wheel with the other of said driven wheels causes rotation of said shaft in the opposite direction.

6. Apparatus for taking soil samples comprising a self-propelled vehicle having means for driving said vehicle, a vertically reciprocable soil sample tube mounted on said vehicle, said tube being adapted to be inserted into the ground to receive soil samples at its lower end, a spout for the discharge of soil samples from said tube, a receptacle for receiving soil samples from said spout, a piston operatively connected to said tube for raising and lowering the same, a source of fluid under pressure, a four-way valve adapted to admit fluid under pressure from said source selectively to the opposite sides of said piston, means for controlling the position of said four-way valve, an auger mounted for rotation in said sample tube for conveying soil samples upwardly to said spout, and means driven by said vehicle drive means for rotating said auger so as to remove finite samples of soil from the ground.

7. Apparatus for taking soil samples comprising a self-propelled vehicle having means for driving said vehicle, a vertically reciprocable soil sample tube mounted on said vehicle, a piston for controlling the vertical movement of said tube, said tube being adapted to be inserted into the ground to receive soil samples at its lower end, a spout for the discharge of soil samples from said tube, a receptacle for receiving soil samples obtained by said tube, an auger mounted for rotation in said soil sample tube for conveying soil samples upwardly to said spout, and means driven by said vehicle drive means for rotating said auger so as to remove finite amounts of soil from the ground.

8. A device for controlling actuation of a solenoid comprising a screw-threaded shaft mounted for rotation, means for rotating said shaft in either direction, a traveling contact member movable in a reciprocatory path by rotation of said shaft, a pair of limit switches defining the ends of travel of said contact member, said contact member being adapted to close an electrical circuit causing energization of a solenoid when said contact member strikes either of said limit switches, and means for reversing the direction of rotation of said shaft when said contact member strikes either of said limit switches.

9. A device according to claim 8 wherein said means for rotating said shaft in either direction includes a drive wheel and a pair of wheels mounted on said shaft and adapted to be driven alternately by said drive wheel, engagement of said drive wheel with one of said wheels mounted on said shaft causing rotation in one direction and engagement of said drive wheel with the other of said wheels mounted on said shaft causing rotation in the opposite direction.

10. A device according to claim 9 wherein said means for reversing the direction of rotation of said shaft includes a pair of electromagnets adapted to draw said drive wheel alternately toward one or the other of said wheels secured to said screw-threaded shaft, and make-or-break switches adapted to be opened by said traveling contact member to cause de-energization of one of said electromagnets.

11. Apparatus for controlling actuation of a solenoid comprising a screw-threaded shaft mounted for rotation, means for rotating said shaft in either direction, a traveling contact member movable in a reciprocatory path by rotation of said shaft, a pair of limit switches defining the ends of travel of said contact member, means for moving at least one of said limit switches whereby the distance between said limit switches may be varied, said contact member being adapted to close an electrical circuit causing energization of a solenoid when said contact member strikes either of said limit switches, and means for reversing the direction of rotation of said shaft when said contact member strikes either of said limit switches.

12. Apparatus for sampling soil comprising a vehicle, drive means for moving said vehicle, a soil sampling tube mounted on said vehicle and means rotated by said drive means for controlling the travel of said vehicle so as to stop said vehicle at predetermined distances and for controlling means for lowering said soil sampling tube into the soil during the stop.

13. Apparatus according to claim 12 wherein said control means rotated by said drive means include a rotating member and switching means actuated by said rotating member, means for stopping said vehicle at said predetermined distances, said switching means controlling said means for stopping said vehicle at said predetermined distances and controlling said means for lowering said soil sampling tube into the soil.

14. Apparatus according to claim 12 wherein means are provided to allow said soil sampling tube lateral movement.

15. Apparatus according to claim 13 wherein means are provided to change the direction of rotation of said rotating member after each stop of said vehicle.

16. Apparatus according to claim 15 wherein means are provided to change the number of revolutions said rotating member rotates before actuating said switching means so as to change the distance between successive stops of said vehicle.

References Cited

UNITED STATES PATENTS

| | | | |
|---|---|---|---|
| 1,362,775 | 12/1920 | Bunker | 175—310 X |
| 1,604,896 | 10/1926 | Foltz | 175—323 X |
| 1,814,093 | 7/1931 | Rhodes | 175—88 |
| 2,416,036 | 2/1947 | Zimmerlein et al. | 173—19 |
| 2,881,844 | 4/1959 | Miller | 172—110 X |
| 3,190,375 | 6/1965 | Pearson | 175—209 X |
| 3,224,512 | 12/1965 | Alexander | 175—51 X |

JAMES A. LEPPINK, *Primary Examiner.*